(12) United States Patent
Yoshida

(10) Patent No.: US 6,362,865 B2
(45) Date of Patent: Mar. 26, 2002

(54) LIQUID CRYSTAL DISPLAY APPARATUS AND METHOD FOR MANUFACTURING LIQUID CRYSTAL DISPLAY APPARATUS

(75) Inventor: Norihiro Yoshida, Fukaya (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/843,134

(22) Filed: Apr. 27, 2001

(30) Foreign Application Priority Data

Apr. 27, 2000 (JP) .......................................... 12-128356

(51) Int. Cl.⁷ ...................... G02F 1/1333; G02F 11/337
(52) U.S. Cl. ...................... 349/138; 349/122; 349/155; 349/123
(58) Field of Search ................................ 349/155, 122, 349/156, 136, 123

(56) References Cited

U.S. PATENT DOCUMENTS 4,744,639 A * 5/1988 Tsuboyama ................. 349/138
6,157,431 A * 12/2000 Ooue et al. ................. 349/155
6,266,122 B1 * 7/2001 Kishimoto et al. ......... 349/123

FOREIGN PATENT DOCUMENTS

JP         3-126921         5/1991

* cited by examiner

Primary Examiner—Toan Ton
(74) Attorney, Agent, or Firm—Pillsbury Winthrop

(57) ABSTRACT

A liquid crystal display apparatus is provided with an array substrate including a first substrate, a switching element formed on the first substrate, an interlayer insulating film formed so as to cover the switching element, a pixel electrode formed on the interlayer insulating film and connected to the switching element via a contact hole formed in the interlayer insulating film, an alignment film formed so as to cover the pixel electrode, and a spacer formed under the alignment film. A flattening layer made with the same material as that of the spacer is arranged between the pixel electrode and the alignment film within a region corresponding to the contact hole.

5 Claims, 3 Drawing Sheets

LIQUID CRYSTAL DISPLAY APPARATUS AND METHOD FOR MANUFACTURING LIQUID CRYSTAL DISPLAY APPARATUS

CROSS-REFERENCE TO RELATED APPLICATIONS

This application is based upon and claims the benefit of priority from the prior Japanese Patent Application No. 2000-128356, filed Apr. 27, 2000, the entire contents of which are incorporated herein by reference.

BACKGROUND OF THE INVENTION

The present invention relates to a liquid crystal display apparatus and a method for manufacturing the same, and in particular to a liquid crystal display apparatus which has contact holes in an insulating layer covering switching elements, and a method for manufacturing the liquid crystal display apparatus.

In recent years, in the field of information processing apparatuses mainly including computers, and the field of video processing apparatus mainly including television sets, lightweight and small-sized liquid crystal display apparatuses which can display an image or a video image in detail have been developed.

Nowadays, most commonly-used liquid crystal display apparatuses comprise two sheets of glass substrate having a plurality of electrodes and a liquid crystal layer between the glass substrates. For example, in a color active matrix type liquid crystal apparatus, a matrix array substrate, which is a first substrate, is provided with a switching element such as a thin film transistor whose amorphous silicon or polysilicon is a semiconductor layer, or the like, and a pixel electrode, a scanning line and a signal line which are connected to the switching element. On the other hand, a counter substrate, which is a second substrate, is provided with a color filter including colored layers corresponding to the three primary colors, and a counter electrode. Also, these two substrates are fixed to each other with an adhesive formed on peripheral portions of the substrates through a spacer for keeping the distance therebetween constant.

In recent years, in order to relax the pasting accuracy between the substrates and improve the aperture ratio, an insulating layer comprising a color filter layer or a transparent resin is ordinarily arranged between the switching element and the pixel electrode on the matrix array substrate. In this case, for electrically connecting the switching element and the pixel element, it is necessary to form a contact hole in the insulating layer.

However, there is a likelihood that the following disadvantages may occur due to the existence of the contact hole. That is, dust may attach to an inside wall of a recess of the contact hole, thereby reducing the reliability of the liquid crystal display apparatus. Also, printing properties of an alignment film for orienting the liquid crystals may deteriorate to cause an uneven display.

BRIEF SUMMARY OF THE INVENTION

The present invention has been made in order to solve the above problems, and an object thereof is to provide a liquid crystal display apparatus which has a good display quality and a high reliability, and a method for manufacturing the liquid crystal display apparatus.

An aspect of the present invention is a liquid crystal display apparatus comprising: an array substrate including a first substrate, a switching element formed on the first substrate, an interlayer insulating film formed so as to cover the switching element, a pixel electrode formed on the interlayer insulating film and connected to the switching element via a contact hole formed in the interlayer insulating film, an alignment film formed so as to cover the pixel electrode, and a spacer formed under the alignment film;

a counter substrate arranged so as to oppose the array substrate; and liquid crystal composition arranged between the array substrate and the counter substrate, wherein a flattening layer made with the same material as that of the spacer is arranged between the pixel electrode and the alignment film within a region corresponding to the contact hole.

Also, another aspect of the present invention is a method for manufacturing a liquid crystal apparatus where a liquid crystal layer is sandwiched between a first substrate and a second substrate, comprising the steps of:

forming a switching element on the first substrate;

forming an interlayer insulating film having a contact hole corresponding to one portion of the switching element and covering the switching element;

forming a pixel electrode connected to the switching element via the contact hole on the interlayer insulating film;

forming a spacer and simultaneously forming a flattening layer within a region corresponding to the contact hole;

forming an alignment film after formation of the flattening layer; and performing a rubbing process on the alignment film.

According to the present invention, the contact hole is fattened by the flattening layer, so that dust can be prevented from adhering to the inside of the contact hole and the printing property of the alignment film can be improved. Accordingly, it becomes possible to provide a liquid crystal display apparatus which has an excellent display quality and a high reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of a liquid crystal display apparatus and a method for manufacturing the liquid crystal display apparatus according to the present invention will be explained in detail below with reference to the drawings.

First Embodiment

Figure 1:
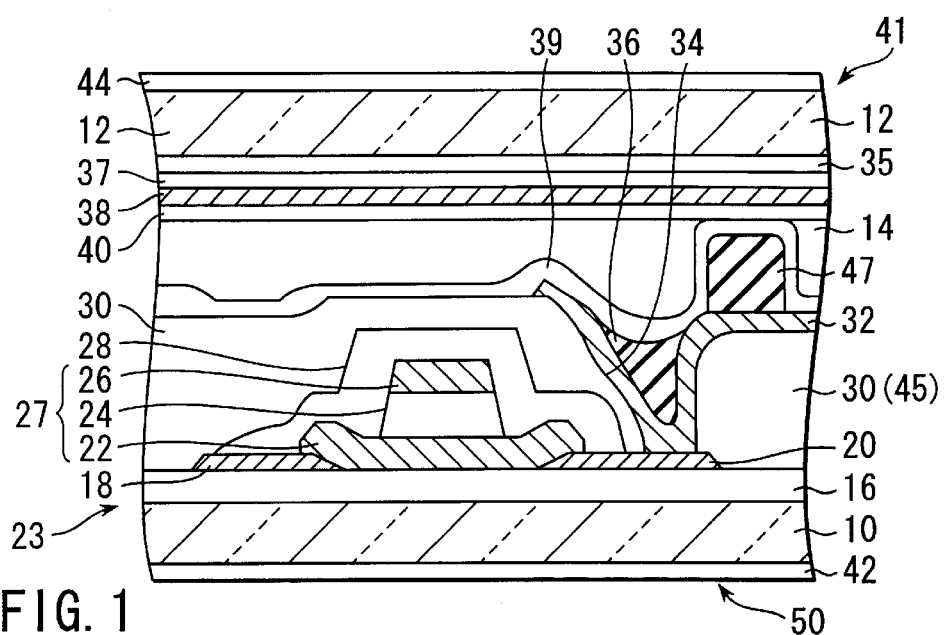
FIG. 1 is a sectional view schematically showing a structure of a liquid crystal display apparatus according to an embodiment of the present invention.
Figure 2:
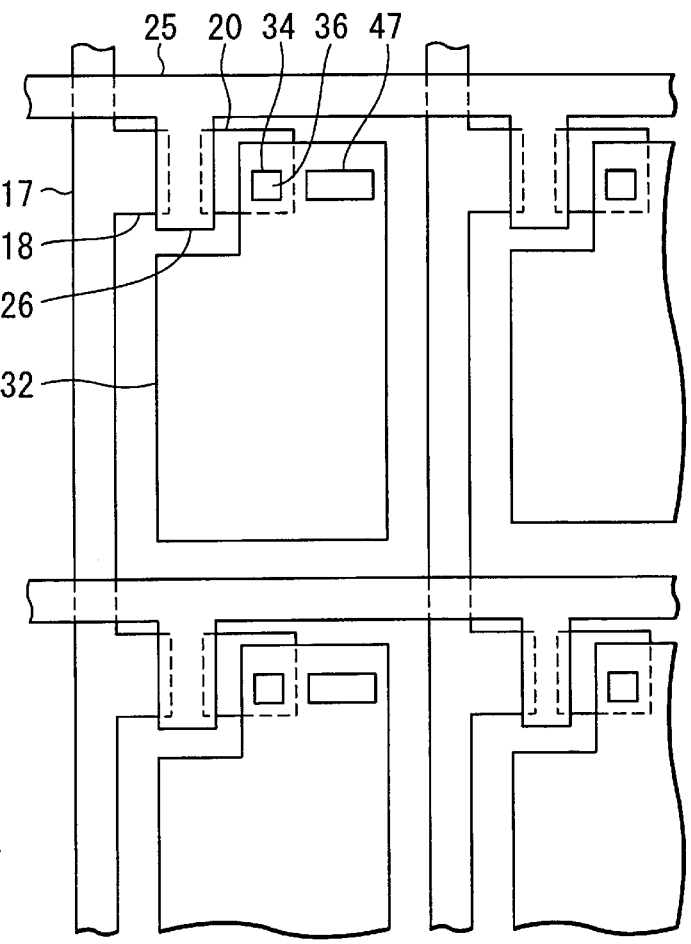
FIG. 2 is a plan view schematically showing a matrix array substrate which is applied to the liquid crystal display apparatus shown in FIG. 1.

FIG. 1 is a sectional view of a liquid crystal display apparatus according to a first embodiment of the present invention. FIG. 2 is a plan view showing an electrode structure and the like on a matrix array substrate 23 which is applied to the liquid crystal display apparatus shown in FIG. 1, where some of the configuration elements have been omitted for clarity.

As shown in FIG. 1, a liquid crystal display apparatus 50 comprises a glass substrate 10 which is a first substrate, a glass substrate 12 which is a second substrate, and a liquid crystal layer 14 sandwiched between the glass substrates 10 and 12.

The matrix array substrate 23 is structured by forming a thin film transistor 27 which is a switching element and the like on the glass substrate 10 which is the first substrate. Also, a counter substrate 41 is structured by forming a counter electrode 38 and the like on the glass substrate 12.

A detailed structure of the matrix array substrate 23 will be explained below.

Formed on a main surface of the transparent glass substrate 10 is an undercoat film 16 made of silicon oxide (SiOx). Also, formed on the undercoat film 16 are a source electrode 18 and a drain electrode 20 made of molybdenum tungsten (MoW) or the like. The source electrode 18 is formed integrally with a signal line 17 shown in FIG. 2 so as to project therefrom.

Furthermore, a semiconductor layer 22 made of amorphous silicon (a-Si) forming a channel region is formed between the source electrode 18 and the drain electrode 20. Stacked on a central portion of the semiconductor layer 22 is a gate insulating layer 24 made of silicon nitride (SiNx).

A gate electrode 26 made of aluminum/molybdenum (Al/Mo) or the like is formed on the gate insulating layer 24. The gate electrode 26 is formed integrally with a scanning line 25 shown in FIG. 2 so as to project therefrom. As a result, a thin film transistor 27 of a positive stagger type serving as a switching element is formed. The thin film transistor 27 is covered with a silicon nitride film 28 which protects the thin film transistor 27.

Furthermore, an acrylic resin insulating layer 30 made of acrylic resin is formed on the entire surface including the silicon nitride film 28. The acrylic resin insulating layer 30 serves as an insulating layer made of a first insulating material.

A pixel electrode 32 made of a transparent conductive material such as ITO (Indium Tin Oxide) is positioned on the acrylic resin insulating layer 30.

The pixel electrode 32 is electrically connected to the drain electrode 20 via a contact hole 34 formed in the acrylic resin insulating layer 30.

The contact hole 34 is generally filled by a flattening layer 36 made of organic system resin. Furthermore, a spacer 47 made of the same material as that of the flattening layer 36 is disposed on the pixel electrode 32.

Next, the detailed structure of the counter substrate 41 will be explained.

The counter substrate 41 comprises red, green and blue color filters 35 disposed on a main surface of the transparent glass substrate 12 serving as a second substrate, a flattening protection film 37 which is disposed on these color filters 35 so as to cover and flatten the color filters 35, and a transparent counter electrode 38 formed on the flattening protection film 37 and made of transparent conductive metal such as ITO.

Alignment films 39 and 40 made of polyimide are respectively provided on surfaces of the matrix array substrate 23 and the counter substrate 41 which are opposed to each other. Also, the matrix array substrate 23 and the counter substrate 41 are provided with polarizing plates 42 and 44 adhered to the other surfaces of the substrates 23 and 41 opposed to the alignment films 39 and 40.

Furthermore, the matrix array substrate 23 and the counter substrate 41 are fixed to each other by bonding peripheral portions thereof together. The liquid crystal layer 14 is sealed between the matrix array substrate 23 and the counter substrate 41 in a sandwiching manner.

Next, manufacturing steps of the above-mentioned liquid crystal display apparatus will be explained with reference to FIGS. 3 to 6.

Figure 3:
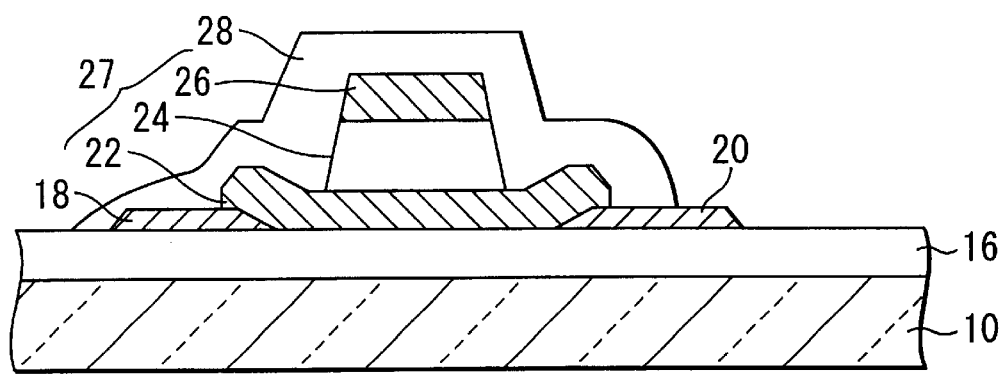
FIG. 3 is a sectional view schematically showing one manufacturing step of the liquid crystal display apparatus shown in FIG. 1.

(1) As shown in FIG. 3, the undercoat layer 16 of silicon oxide is formed on the glass substrate 10 by a CVD process.

Furthermore, a MoW film or the like is formed on the undercoat film 16 by a spattering process or the like, and the source electrode 18 and the drain electrode 20 are formed by patterning, simultaneously with the formation of the signal line 17.

Subsequently, semiconductor made of amorphous silicon (a-Si) or the like is deposited by a plasma CVD process or the like and patterning is then performed to form the semiconductor layer 22.

Subsequently, after deposition of an insulating film effected by a CVD process and formation of an Al/Mo film effected by a spattering process, the gate insulating layer 24 and the gate electrode 26 are formed by patterning. Incidentally, simultaneously therewith, the scanning line 25 is also formed.

Furthermore, phosphorus (P) or the like is doped in the semiconductor layer 22 to form $n^+$-a-Si in a portion of the semiconductor layer 22, and thereafter the phosphorus doped is activated by laser annealing processing or the like.

Then, silicon nitride is deposited by a CVD process or the like, and the silicon nitride film 28 is formed through patterning.

Figure 4:
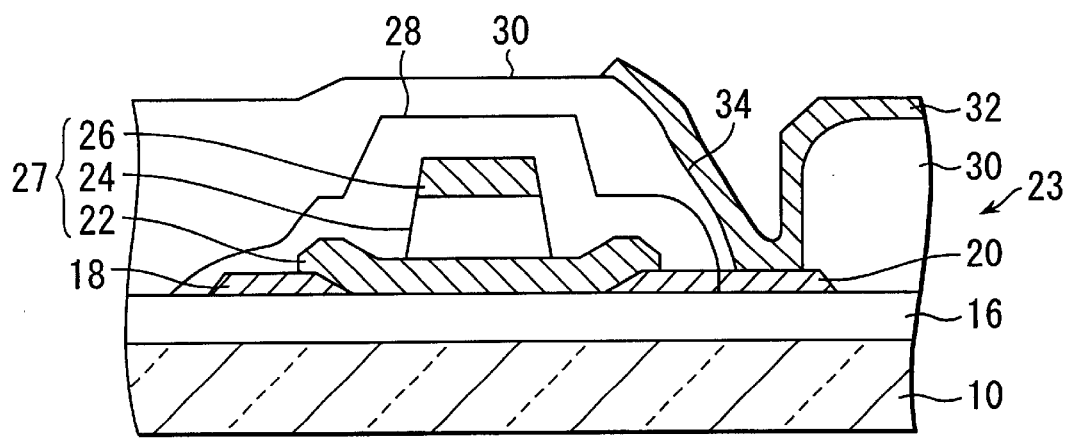
FIG. 4 is a sectional view schematically showing one manufacturing step of the liquid crystal display apparatus shown in FIG. 1.

(2) Next, as shown in FIG. 4, acrylic resin is applied and patterned to form the acrylic resin insulating layer 30 (insulating layer forming step). By this patterning, the contact hole 34 is simultaneously formed in the acrylic resin insulating layer 30.

Subsequently, ITO (Indium Tin Oxide) is formed by a spattering process or the like, and the pixel electrode 32 is formed through patterning (pixel electrode forming step). At this time, the pixel electrode 32 is electrically connected to the drain electrode 20 through the contact hole 34.

In the above manner, the matrix array substrate 23 is formed.

Figure 5:
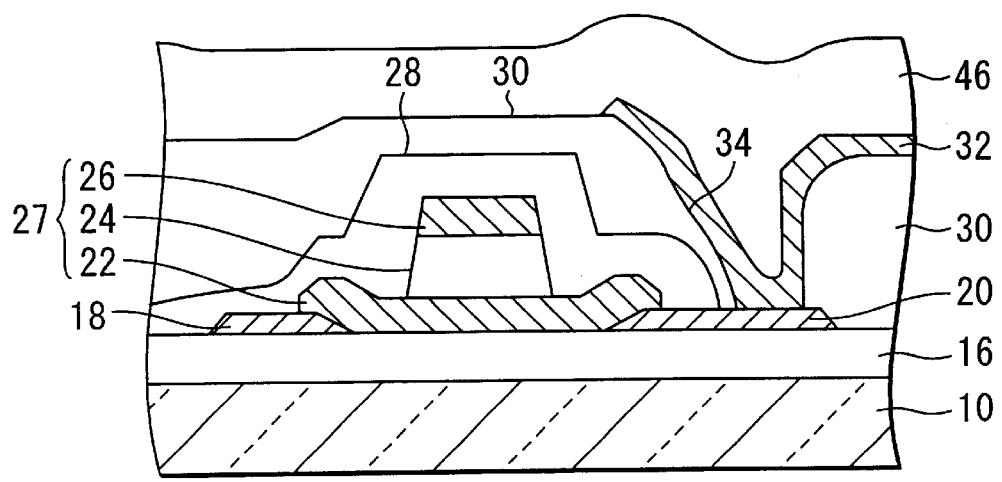
FIG. 5 is a sectional view schematically showing one manufacturing step of the liquid crystal display apparatus shown in FIG. 1.

(3) Next, as shown in FIG. 5, a photosensitive resin layer 46 is formed by spin coating (flattening layer forming preceding step). At this time, the photosensitive resin 46 is also filled in the contact hole 34.

Figure 6:
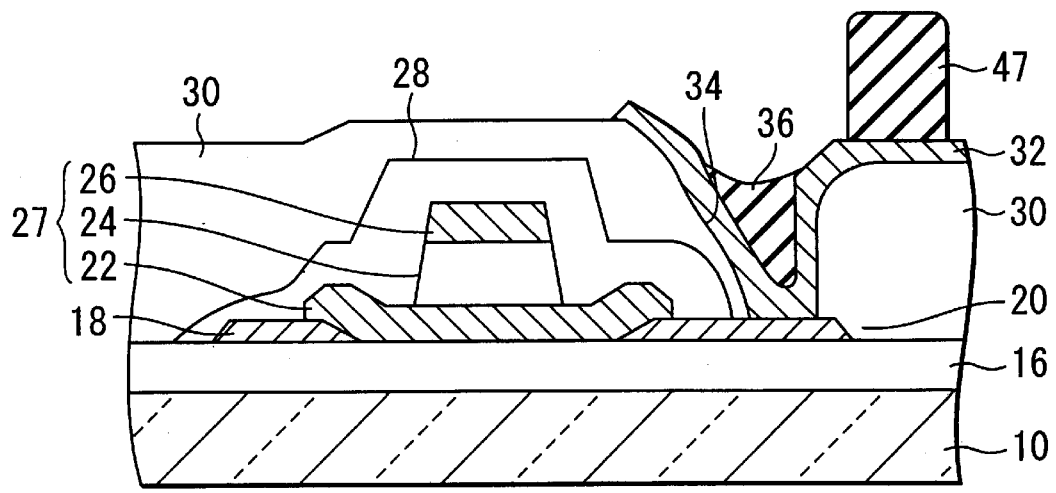
FIG. 6 is a sectional view schematically showing one manufacturing step of the liquid crystal display apparatus shown in FIG. 1.

(4) Next, as shown in FIG. 6, the flattening layer 36 is formed in the contact hole 34, and simultaneously a spacer 47 is formed on the pixel electrode 32 (flattening layer forming later step).

At this time, the photosensitive resin layer 46 is first exposed to ultraviolet rays using a photo mask for forming the spacer 47. The photo mask has such a mask pattern that ultraviolet rays are irradiated on a portion where the spacer 47 is formed and ultraviolet rays are not irradiated on the other portion.

By developing the exposed photosensitive resin with developer, the spacer 47 and the flattening layer 36 are formed.

The spacer 47 is formed since the photosensitive resin exposed to ultraviolet rays hardly dissolves in the developer.

The control of the remaining state of the photosensitive resin in the contact hole 34 can be performed by changing the thickness of the photosensitive resin layer 46 inside and outside the contact hole 34.

That is, when any film is applied on a substrate by spin coating, liquid material is dropped on the substrate, and then a uniform film is formed on the surface of the substrate by rotating the substrate. However, when there is a recess on the substrate, liquid material easily gathers in this recess, so that the thickness of a film formed on the recess becomes larger than that on the other portion of the substrate. The difference in thickness is determined according to such a condition such as the shape of the recess, the viscosity of the liquid material, the rotation speed of the substrate or the like.

In this manner, since the thickness of the portions of the photosensitive resin layer 46 which are positioned inside and outside the contact hole 34 are different, it becomes possible to remove the photosensitive resin layer 46 outside the contact hole 34 (except for the spacer 47) and leave it inside the contact hole 34 by performing adjustment of the dipping time in the developer.

Figure 7:
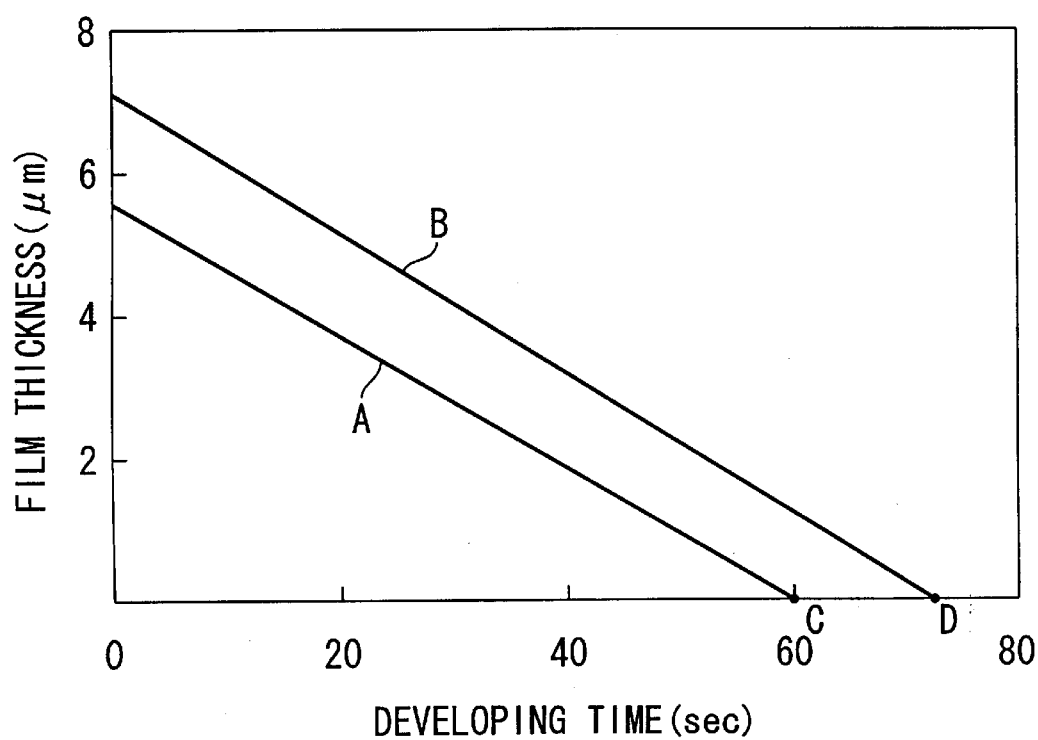
FIG. 7 is a diagram showing the relationship between the film thickness of an insulating layer and the dipping time of the insulating layer into developer during a manufacturing step of a liquid crystal display apparatus according to one embodiment of the present invention.

FIG. 7 is a diagram showing a relationship between the dipping time of the photosensitive resin layer 46 in the developer and the change in film thickness thereof. A graph A corresponds to the film thickness of the photosensitive resin layer positioned outside the contact hole 34 and a graph B corresponds to the film thickness of the photosensitive resin layer positioned inside the contact hole 34.

Before the photosensitive resin layer was dipped in the developer, the film thicknesses of portions of the photosensitive resin layer 46 positioned inside and outside the contact hole 34 were respectively 6.5 $\mu$m and 5.5 $\mu$m. From the fact that the slopes of the graphs A and B are equal to each other, it is understood that the etching speeds of the portions of the photosensitive resin layer positioned inside and outside the contact hole 34 are equal to each other.

As a result, at a point C, the photosensitive resin layer 46 is removed outside the contact hole 34 and the photosensitive resin layer 46 remains inside the contact hole 34.

The reason is that the photosensitive resin layer 46 positioned inside the contact hole 34 is not removed completely until the graph reaches a point D. That is, the remaining state of the photosensitive resin layer 46 inside the contact hole 34 can be controlled by controlling the dipping time in the developer between the point C (processing time: 60 seconds) and the point D (processing time: 72 seconds).

Thus, the flattening layer 36 is formed in the contact hole 34.

(5) Next, the polyimide films (alignment films 39 and 40) are formed on the faces of the matrix array substrate 23 and the counter substrate 39 which are opposed to each other, while the polarizing plates 42 and 44 are adhered on the other faces of the substrates 23 and 39, and the liquid crystal layer 14 is sealed between the matrix array substrate 23 and the counter substrate 41 so that the liquid crystal display apparatus 50 is formed.

Second Embodiment

The second embodiment is different from the first embodiment in the following points.

(1) Formation of the flattening layer 36 is performed by a patterning process using a mask (in the first embodiment, the formation was performed by utilizing the difference in thickness between the portions of the resin layer positioned inside and outside the contact hole 34).

(2) A color filter is formed on the matrix array substrate 23 (in the first embodiment, the color filter was formed on the counter substrate). Then, the color filter is an insulating layer constituted of the first insulating material in this embodiment.

That is, the present embodiment is different from the first embodiment shown in FIGS. 1 and 2 regarding a point that the color filter 35 is not formed on the counter substrate 41 and the acrylic resin insulating layer 30 on the matrix array substrate 23 is formed of the color filter 45 instead thereof.

Regarding the present embodiment, a manufacturing method effected after the formation of a thin film transistor will be explained below.

(1) A photosensitive resist, where red pigment is dispersed, is applied on the entire surface by a spinner, and drying is performed at 90° C. for 10 minutes. Thereafter, ultraviolet rays are irradiated on only the portion where the red colored layer is formed, and the photosensitive resist is exposed such that the exposure amount becomes 200 mJ/cm$^2$ via such a photo mask that ultraviolet rays are shielded on an outer peripheral portion (width: 10 $\mu$m) and a portion where the contact hole 34 is formed (20 $\mu$m×20 $\mu$m). Subsequently, the photosensitive resist is developed with an aqueous solution of potassium hydroxide 1 wt % for 20 seconds and baking is performed at 200° C. for 60 minutes so that the red colored layer is formed.

Similarly, by forming the green and red colored layers sequentially, the color filter 45 where the thickness of each colored layer is 1.5 $\mu$m is formed (insulating layer forming step). Here, respective photosensitive resists are used for the green color material and the blue color material.

Then, after ITO is sputtered such that its film thickness is about 0.1 $\mu$m, the pixel electrode 32 which is electrically connected to the source electrode 20 via the contact hole 34 is formed by photolithography (pixel electrode forming step).

(2) Furthermore, the application of photosensitive black resin is performed by a spinner and drying is performed at 90° C. for 10 minutes (flattening layer forming preceding step). Then, the black resin is exposed with the exposure amount of 300 mJ/cm$^2$ via such a photo mask that ultraviolet rays are irradiated on a portion where the spacer 47 is formed (7 $\mu$m×15 $\mu$m), an outer peripheral portion of a display area (width: 3 mm) and the portion of the contact hole 34 (20 μm×20 μm). Furthermore, the black resin is developed with alkaline aqueous solution of pH=11.5, and baking is performed at 200° C. for 60 minutes so that a light shielding layer is formed on the spacer 47 and outer peripheral portions of the display area. Simultaneously, the flattening layer 36 for flattening the contact hole 34 is formed (flattening layer forming later step).

(3) After alignment film material is applied on the matrix array substrate 23 thus produced and the alignment film 39 is formed, rubbing processing is performed. After the alignment film 40 is similarly formed on the counter substrate 41 formed with a common electrode which is the counter electrode 38, rubbing processing is performed.

Subsequently, the matrix array substrate 23 and the counter substrate 41 are joined to each other with adhesive comprising epoxy thermosetting resin, and liquid crystal composition is poured between the substrates 23 and 41 and the pouring hole is sealed by ultraviolet-setting resin.

Furthermore, the polarizing plates 42 and 44 are attached to the outer surfaces of the matrix array substrate 23 and the counter substrate 41 so that the liquid crystal display apparatus is manufactured.

When the liquid crystal display apparatus thus manufactured was driven, any poor luminescent spot due to dust adhesion does not occur and a display which has a high quality where display uniformity does not occur could be obtained.

Instead of the photosensitive black resin, photosensitive transparent resin may be used.

The present invention is not limited to the above embodiments, and it may be extended or modified within the scope of the invention.

(1) The switching element of the present invention is not limited to the thin film transistor and it may be an element with two terminals, such as a diode.

(2) The color filter may be provided on either the matrix array substrate or the counter substrate, and such a structure can be employed that the color filter is not provided.

(3) The basic idea of the present invention lies in that the flattening layer is formed for flattening the contact hole which electrically connects the switching electrode and the pixel electrode. In the embodiments, the two methods of the method for performing patterning using the photosensitive resin and the method where the difference in thickness between the portions of the photosensitive resin positioned inside and outside the contact hole is utilized have been disclosed. In the present invention, however, the method for forming the flattening layer is not limited to these methods necessarily.

For example, the flattening layer can be formed by using such a combination of insulating material and etchant (processing solution) that the portions positioned inside and outside the recess of the contact hole are different in etching speed.

Furthermore, the material for the flattening layer is not limited to organic materials, as inorganic materials can be used for the material.

As set forth above, according to the liquid crystal display apparatus and the method for manufacturing a liquid crystal display apparatus of the present invention, the substrate is flattened by forming the flattening layer in the contact hole. For this reason, dust can be prevented from adhering inside the contact hole and the printing property of the alignment film can be improved. Accordingly, it becomes possible to provide a liquid crystal display apparatus whose display quality is excellent and which has a high reliability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
an array substrate including a first substrate, a switching element formed on the first substrate, an interlayer insulating film formed so as to cover the switching element, a pixel electrode formed on the interlayer insulating film and connected to the switching element via a contact hole formed in the interlayer insulating film, an alignment film formed so as to cover the pixel electrode, and a spacer formed under the alignment film;
a counter substrate arranged so as to oppose the array substrate; and
liquid crystal composition arranged between the array substrate and the counter substrate,
wherein a flattening layer made with the same material as that of the spacer is arranged between the pixel electrode and the alignment film within a region corresponding to the contact hole.

2. A liquid crystal display apparatus according to claim 1, wherein the flattening layer is made of resin.

3. A liquid crystal display apparatus according to claim 2, wherein the flattening layer has a black color.

4. A liquid crystal display apparatus according to claim 1, wherein the interlayer insulating film is a color filter.

5. A method for manufacturing a liquid crystal apparatus where a liquid crystal layer is sandwiched between a first substrate and a second substrate, comprising the steps of:
forming a switching element on the first substrate;
forming an interlayer insulating film having a contact hole corresponding to one portion of the switching element and covering the switching element;
forming a pixel electrode connected to the switching element via the contact hole on the interlayer insulating film;
forming a spacer and simultaneously forming a flattening layer within a region corresponding to the contact hole;
forming an alignment film after formation of the flattening layer; and
performing a rubbing process on the alignment film.

* * * * *